United States Patent [19]

Greene

[11] 4,059,993
[45] Nov. 29, 1977

[54] SYSTEM FOR MONITORING WATER FLOW ANGLE RELATIVE TO A BOAT KEEL

[75] Inventor: Leonard M. Greene, Chappaqua, N.Y.

[73] Assignee: Safe Flight Instrument Corporation, White Plains, N.Y.

[21] Appl. No.: 716,659

[22] Filed: Aug. 23, 1976

[51] Int. Cl.$^2$ .............................................. G01C 21/00
[52] U.S. Cl. ...................................... 73/178 R; 73/188
[58] Field of Search .................. 73/178 R, 180, 188, 73/189; 340/29

[56] References Cited

U.S. PATENT DOCUMENTS

| 2,586,010 | 2/1952 | Divoll | 73/189 |
| 3,845,734 | 11/1974 | Demos | 73/188 X |

FOREIGN PATENT DOCUMENTS

| 833,421 | 4/1960 | United Kingdom | 73/178 R |
| 1,290,331 | 9/1972 | United Kingdom | 73/188 |

*Primary Examiner*—Charles A. Ruehl
*Attorney, Agent, or Firm*—Edward A. Sokolski

[57] ABSTRACT

A sensing vane is placed near the leading edge of the keel of a sailboat where the water flow splits. The vane is deflected away from a "center" position (i.e., a position aligned with the keel) by the water stream as a function of the water flow angle (the angle between the heading of the boat and its path through the water). The rotational movement of the vane is sensed by a synchro transmitter which drives a synchro follower positioned at a location near the helm of the boat where it drives an indicator dial. The indicator dial is appropriately calibrated for each boat to provide a direct reading of flow angle, the ratio between the side force of the water on the keel ($S_k$) and the water drag force ($D_k$) being a function of this angle. The dial is marked to provide an indication when optimum flow angle (i.e., that for maximum $S_k/D_k$) is being achieved. In addition, an alerting signal may be provided when such optimum condition exists. It should be noted that the water flow angle relative to the keel differs from the leeway angle by the cosine of the heel angle, i.e., water flow angle = cos heel angle × leeway angle.

10 Claims, 8 Drawing Figures

WATER FLOW ANGLE

SYSTEM FOR MONITORING WATER FLOW ANGLE RELATIVE TO A BOAT KEEL

This invention relates to an indicator for use in sailing, and more particularly to such device which provides a continuous indication of the flow angle of a sailboat and alerts the helmsman when the flow angle is optimum.

In sailing a boat, best headway is obtained at a particular flow angle (angle between the boat's heading and its path through the water). This optimum flow angle varies somewhat for each boat. Increasing the flow angle increases the sidewise force of the water on the keel, and also increases the drag force, due to turbulence around the keel. The sidewise force on the keel is important in that it counteracts the sidewise force of the wind on the sails. These factors are most significant when sailing "close-hauled", i.e., close to into the wind. Optimum sailing is obtained when the ratio between the side force of the water on the keel ($S_k$) and the drag force on the keel ($D_k$) is maximum, this ratio varying as a function of the boat's flow angle ($\alpha$). The relationship between $S_k/D_k$ and $\alpha$ varies with each type of boat. The present invention provides an indicator display calibrated for each boat which continuously shows the flow angle (or $S_k/D_k$) and in addition affords a dial indication for optimum flow angle (maximum $S_k/D_k$) as well as an alerting signal when this condition is being attained.

It is therefore an object of this invention to provide means for facilitating the optimum sailing of a sailboat.

It is a further object of this invention to provide a continuous indication of the flow angle of a sailboat.

It is still another object of this invention to provide an indication and alerting signal when an optimum sailboat flow angle is being attained.

Other objects of this invention will become apparent as the description proceeds in connection with the accompanying drawings, of which:

Briefly described, the invention is as follows: A rotatably supported vane is positioned immediately forward of the leading edge of the boat keel. The rotational position of the vane varies as a function of the water flow angle of the boat. The vane is coupled to a position transducer which provides an electrical signal to a position follower located near the helm of the boat. The follower drives an indicator dial which is calibrated to indicate the flow angle of the boat. The optimum flow angle for the particular boat is marked on the dial, this angle having been determined as that at which the ratio between the sidewise water force on the keel ($S_k$) and the drag on the keel ($D_k$) is maximum. When this optimum flow angle is being attained, an alerting device, which may be in the form of an indicator lamp, is actuated. It is to be noted that the water flow angle is equal to the cosine of the heel angle of the boat times the boat's leeway angle. Thus, the water flow angle equals the leeway angle when the heel angle is zero.

Figure 1:
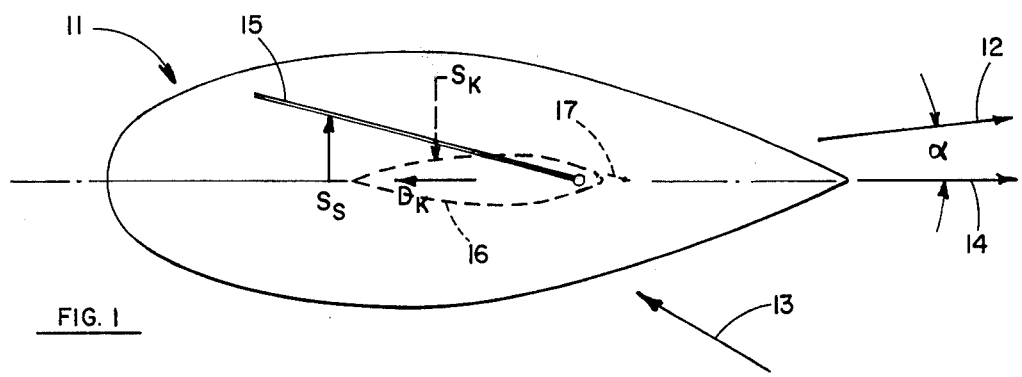
FIG. 1 is a diagrammatic view illustrating various factors involved in the operation of the invention.

Referring now to FIG. 1, various parameters involved in the operation of the device of the invention are illustrated. Sailboat 11 is shown sailing along a path through the water indicated by arrow 12. The apparent wind is indicated by arrow 13 and the heading of the boat by arrow 14. The flow angle, $\alpha$, is the angle between the boat's heading 14 and its path 12 through the water. The sidewise component of wind force, $S_s$, acting on the sail 15 of the boat is shown, as is the sidewise water force, $S_k$, acting on the keel 16 which is opposite in direction to the wind force. The drag force, $D_k$, on the keel is also shown. Vane 17 is mounted forward of the leading edge of the keel for rotation about an axis located in the longitudinal center plane of the boat. The sidewise component of water force, $S_k$, acting on the keel effectively counteracts the sidewise wind component acting on the sail, $S_s$.

Figure 2:
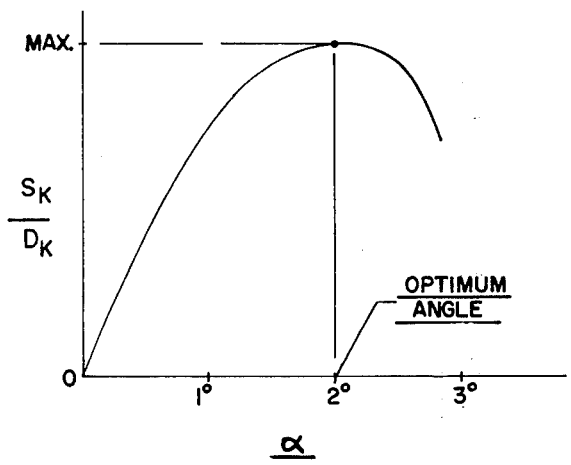
FIG. 2 is a graph illustrating the relationship between $S_k/D_k$ and $\alpha$.

Referring now to FIG. 2, a plot of $S_k/D_k$ vs. flow angle, $\alpha$, is illustrated. This plot is different for each type of sailboat and the plot shown is merely illustrative. As can be seen in FIG. 2, $S_k/D_k$ peaks to a maximum at a flow angle of 2° and then falls off at greater flow angles. Optimum sailing conditions are attained for the flow angle at which $S_k/D_k$ is maximum. In implementing the invention, this optimum flow angle must be determined for each type of sailboat on which the device of the invention is installed.

Figure 4:
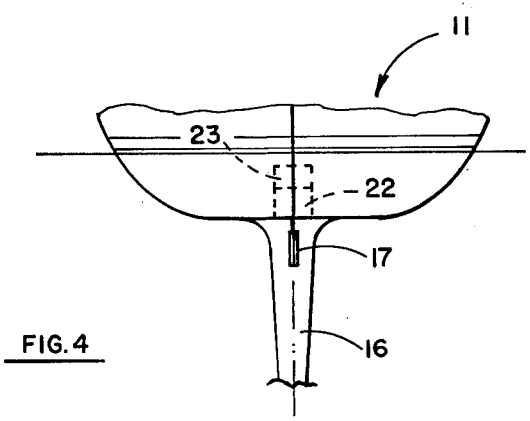
FIG. 4 is a front elevational view showing the flow sensing vane of the invention installed on a sailboat.
Figure 3:
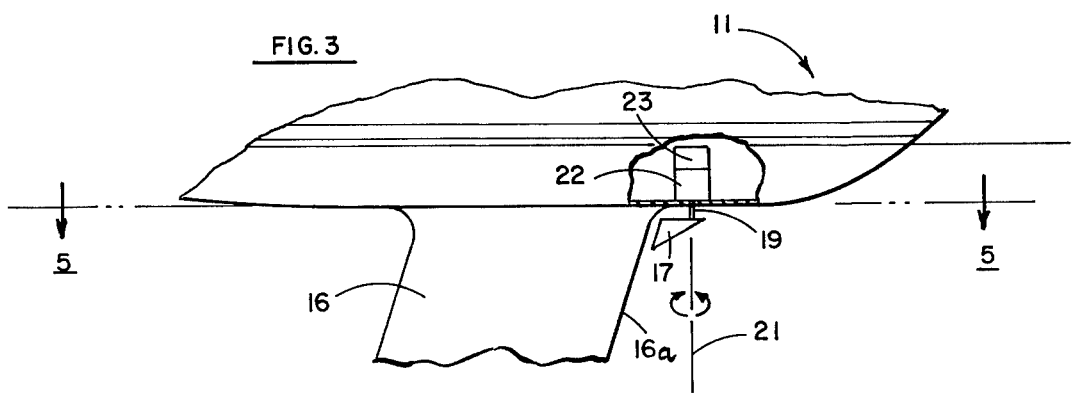
FIG. 3 is a side elevational view illustrating the flow sensing vane of the invention installed on a sailboat.
Figure 5:
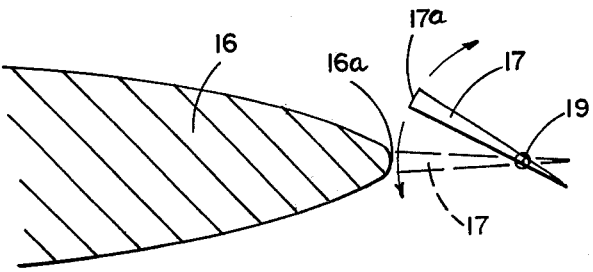
FIG. 5 is a cross-sectional view taken along the plane indicated by 5—5 in FIG. 1.

Referring now to FIGS. 3–5, a typical installation of the sensing vane of the device of the invention is illustrated. Flow sensing vane 17 is rotatably mounted forward of the leading edge of the keel 16 of boat 11. Vane 17 is supported on shaft 19 which is coupled to gear box 22 which in turn is coupled to synchro transmitter 23. Shaft 19 is positioned for rotation about longitudinal axis 21 which is located in the longitudinal center plane of the boat. Vane 17 is attached near one end thereof to shaft 19 with the vane extending towards the leading edge 16a of the keel. The water stream thus drives the vane about axis 21 from a central position where its edge 17a is directly opposite the leading edge 16a of the keel (indicated by dotted lines in FIG. 5) to positions away from the leading edge of the keel. The angular rotation of vane 17 is a function of the flow angle of the boat. It is to be noted that the actual rotation of the vane will be substantially greater than the flow angle such that a calibration factor must be provided in the readout mechanism to provide direct leeway angle readings on the indicator.

Figure 6:
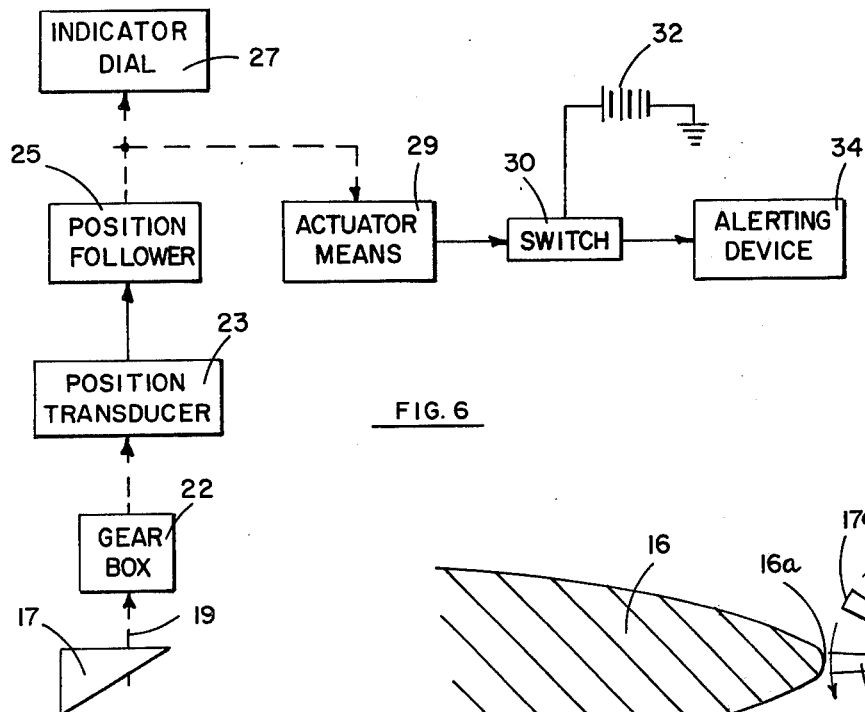
FIG. 6 is a block diagram illustrating a preferred embodiment of the invention.

Referring now to FIG. 6, a preferred embodiment of the invention is schematically illustrated. Sensing vane 17 is coupled by means of shaft 19 through gearbox 22 to position transducer 23 which may comprise a synchro transmitter. Gearbox 22 is used to suitably step up the rotation of the vane to provide an increased rotation for relatively small rotation angles of shaft 19. The electrical output of transducer 23 is fed to position follower 25 which may comprise a synchro follower and which is located remotely from the transducer near the helm or tiller of the boat. Follower 25 drives indicator dial 27, the dial providing an indication of the boat's flow angle. Follower 25 has actuator means 29 associated therewith for actuating switch 30 at a predetermined optimum flow angle. Actuator means 29 may comprise a cam on the shaft of the follower, or may comprise an electro-optical or magnetic pickup device which senses a suitable marker on this shaft. When this optimum flow angle is being sailed, switch 30 connects power source 32 to alerting device 34, which may comprise a signal lamp.

Figure 7:
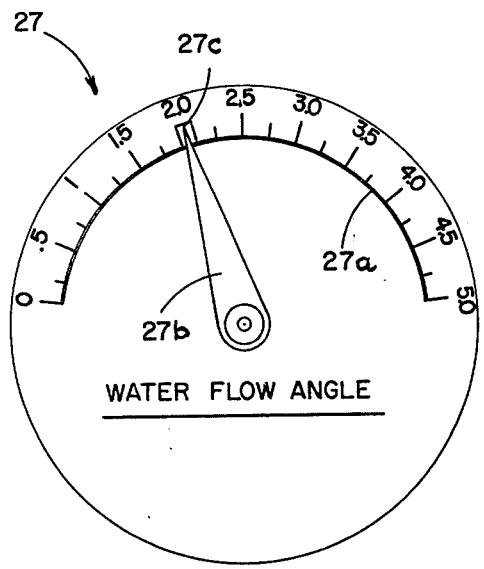
FIG. 7 is a pictorial view illustrating an indicator which may be used in the device of the invention.

Referring now to FIG. 7, indicator dial 27 is illustrated. The dial scale 27a is marked to show flow angle readings between 0° and 5°. Dial pointer 27b is rotatably driven by the shaft of follower 25. The system is calibrated for each type of boat by the design of gearbox 22 and dial scale 27a to provide direct readings on scale 27a of the actual flow angle of the boat. A marker 27c which may be in the form of a red colored rectangle is provided at the optimum flow angle for the particular boat, which angle is determined as has been described in connection with FIG. 2.

Figure 8:
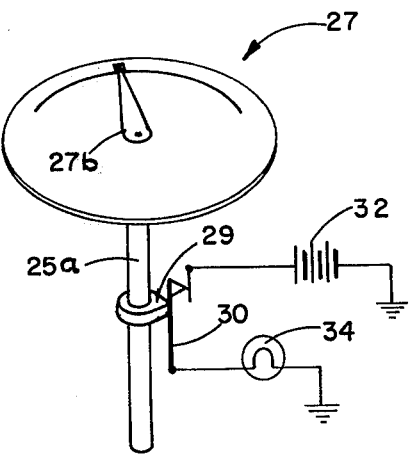
FIG. 8 is a schematic view illustrating an alerting mechanism which may be utilized in the device of the invention.

Referring now to FIG. 8, an embodiment of the alerting device is illustrated. The drive shaft 25a of follower 25 which drives pointer 27b has a cam 29 thereon which operates to close micro-switch 30 whenever the boat is being sailed at the optimum flow angle. Thus, at such time, power source 32 is connected to alerting indicator lamp 34 to provide an indication of this condition to the helmsman.

While the invention has been described and illustrated in detail, it is to be clearly understood that this is intended by way of illustration and example only and is not to be taken by way of limitation, the spirit and scope of this invention being limited only by the terms of the following claims.

I claim:

1. A device for monitoring the angle between the direction of ambient water flow and the keel of a sailboat comprising:
    a sensing vane mounted on the hull of the boat immediately forward of the leading edge of the sailboat keel for rotation about an axis substantially parallel to the longitudinal center plane of the hull,
    means responsive to rotational movement of said vane for providing a rotational movement in accordance with said vane movement at a location remote from said vane, and
    indicator means responsive to said last mentioned means for providing an indication of the flow angle, said indicator means comprising an indicator dial having a dial scale calibrated to indicate various values of water flow angle and an identifiable indication on said scale indicating optimum water flow angle.

2. The device of claim 1 wherein the rotation axis of said vane is located in the longitudinal center plane of said boat, said vane in its central position extending from said rotation axis towards the leading edge of the keel.

3. The device of claim 1 and further including means responsive to the remotely provided rotational movement in accordance with vane movement for providing an alerting signal when said optimum water flow angle is being attained.

4. The device of claim 1 wherein said means responsive to rotational movement of said vane comprises a position transducer coupled to the rotational output of the vane for generating an electrical signal in accordance with said rotational output and a follower located at said remote location and connected to said transducer to receive said electrical signal for driving said indicator means.

5. In a device for monitoring the angle between the direction of the ambient water flow and the keel of a sailboat,
    a sensing vane rotatably mounted on the hull of the boat immediately forward of the leading edge of the boat keel, said vane having its rotation axis in the longitudinal center plane of the boat and extending from said rotation axis towards said keel,
    transducer means mounted on said hull and coupled to said vane for generating an electrical signal in accordance with rotational movement of said vane from a predetermined central position,
    follower means mounted on said boat at a location remote from said transducer means and connected to receive the electrical output of said transducer means, said follower means having a rotatable shaft which rotates in accordance with rotation of said vane, and
    an indicator having a scale calibrated to provide readings of the water flow angle, said scale having a marker thereon at the reading for a predetermined optimum water flow angle, said indicator having a pointer which is driven along said scale by the follower means shaft.

6. The device of claim 5 and further including means for generating an alerting signal when said follower means arrives at a predetermined angular position corresponding to said predetermined optimum water flow angle.

7. The device of claim 6 wherein said means for generating said alerting signal comprises an indicator device, a power source, a switch interposed between said indicator device and said power source, and a cam on the shaft of said follower means, said cam actuating said switch to interconnect the indicator device and power source to activate the indicator device whenever the predetermined optimum water flow angle is being attained.

8. The device of claim 5 wherein said marker appears at a water flow angle where the ratio between side force on the boat keel and drag on the boat keel is maximum.

9. A device for monitoring the angle between the direction of ambient water flow and the keel of a sailboat comprising:
    a sensing vane mounted on the hull of the boat immediately forward of the leading edge of the sailboat keel for rotation about an axis substantially parallel to the longitudinal center plane of the hull,
    means responsive to rotational movement of said vane for providing a rotational movement in accordance with said vane movement at a location remote from said vane comprising a position transducer coupled to the rotational output of the vane for generating an electrical signal in accordance with said rotational output and a follower located at said remote location and connected to said transducer to receive said electrical signal,
    indicator means responsive to said follower for providing an indication of the flow angle, and
    means responsive to rotation of said follower for providing an alerting signal when a predetermined optimum water flow angle is being attained.

10. The device of claim 9 wherein said follower has a drive shaft for driving the indicator means, said means for providing the alerting signal comprising a cam on said drive shaft, a power source, an indicator lamp, and a switch interposed between said lamp and said power source, said cam actuating said switch to interconnect the power source and lamp whenever the predetermined angle is being attained.

* * * * *